United States Patent [19]

Mauritz

[11] Patent Number: 5,283,732
[45] Date of Patent: Feb. 1, 1994

[54] GOLF CLUB NUMBER COMPUTING DEVICE

[76] Inventor: Frank Mauritz, P.O. Box 9133, Fort Lauderdale, Fla. 33310

[21] Appl. No.: 836,778

[22] Filed: Feb. 14, 1992

[51] Int. Cl.⁵ .................................... G06F 15/44
[52] U.S. Cl. .................................... 364/410
[58] Field of Search .......... 364/410; 273/32 H, 32 B, 273/193 R, 191 R, 183 D

[56] References Cited

U.S. PATENT DOCUMENTS

| | | | |
|---|---|---|---|
| 3,868,692 | 2/1975 | Woodard et al. | 343/112 D |
| 4,136,394 | 1/1979 | Jones et al. | 364/561 |
| 4,698,781 | 10/1987 | Cockerell | 364/561 |
| 4,703,444 | 10/1987 | Storms et al. | 364/561 |
| 4,815,020 | 3/1989 | Cormier | 364/709.11 |
| 5,046,839 | 9/1991 | Krangle | 356/5 |

OTHER PUBLICATIONS

Advertisement for Rangefinder Golfscope by Tasco.

Primary Examiner—Roy N. Envall, Jr.
Assistant Examiner—Ari M. Bai
Attorney, Agent, or Firm—Oltman and Flynn

[57] ABSTRACT

A golf club number computing device for computing a best golf club number for a player which includes range finding means for finding the range from a player to a hole, computing means, data input means connected to the computing means for receiving range data and player personal data, memory means in the computing means, data tables in the memory means holding golf club number data related to the range data and player personal data, and display means connected to the computing means for displaying a computed best golf club number from the data tables.

12 Claims, 4 Drawing Sheets

GOLF CLUB NUMBER COMPUTING DEVICE

The invention relates to a golf club number computing device for aiding a golf player in selecting the best possible golf club number to use under different circumstances on a golf course, and more particularly to a computing device that enables a player to obtain range to a hole, and to enter the range and different personal data so as to compute a best possible golf club number to use.

BACKGROUND AND PRIOR ART

During play golf players are constantly faced with the problem of selecting a best possible golf club to be used for each stroke. It is well known that the range from the ball to the hole is an important consideration in selecting the best club, but other factors such as the player's skill and personal "fitness" also are important considerations.

It follows that a player, under the strain of attaining a best possible score sometimes misjudges the playing circumstances and selects a club that may not be the best possible selection for the particular circumstances.

Inventors have in the past disclosed devices that are helpful in determining the distance from the ball to the hole. U.S. Pat. No. 5,046,839 shows an electronic range finder that can be used to obtain the distance to the hole by means of a pulsed beam of light directed at the flag in the hole which the player wishes to reach. U.S. Pat. No. 3,868,692 discloses a somewhat similar system, but based on a radio beam directed at the flag.

None of the prior art devices, however, provide the player with a device that is capable of receiving and taking other factors into account, such as the player's experience, skill and personal "fitness", and is capable of issuing a suggestion as to the best possible choice of club to be used for the stroke.

It is accordingly an object of the invention to provide a small, lightweight computing device that a player can bring along and be used to determine the distance to a hole, and is capable of receiving other data in order to determine a best possible selection of a club.

SUMMARY OF THE INVENTION

In accordance with the invention there is provided a golf club number computing device for computing a best golf club number for a player which includes range finding means for finding the range from a player to a hole, computing means, data input means connected to the computing means for receiving range data and player personal data, memory means in the computing means, data tables in the memory means holding golf club number data related to the range data and player personal data, and display means connected to the computing means for displaying a computed best golf club number from the data tables.

In accordance with a further feature, the golf club number computing device includes an optical range finder in the range finding means, or an electronic range finder in the range finding means.

The electronic range finder may advantageously include a beam emitter, a pulse generator for pulsing the beam, a pulsed beam receiver, a phase detector connected to the pulsed beam receiver, and an A/D converter connected to the phase detector for generating the range data.

According to still another feature, a weight, a height and an age table are included in the data tables, and further still, a handicap table and a range table are included in the data tables.

The optical range finder may advantageously include a graded reticule in the optical range finder, graded in distances to the hole.

The golf club number computing device can include a keyboard in the input means, and a liquid crystal display in the display means.

The golf club number computing device according to the invention may include a housing for containing the range finding means, the computing means, the data input means, and the display means.

Further objects and advantages of this invention will be apparent from the following detailed description of a presently preferred embodiment which is illustrated schematically in the accompanying drawings.

Before explaining the disclosed embodiments of the present invention in detail it is to be understood that the invention is not limited in its application to the details of the particular arrangements shown since the invention is capable of other embodiments. Also, the terminology used herein is for the purpose of description and not of limitation.

DESCRIPTION OF THE PREFERRED EMBODIMENTS

Figure 1:
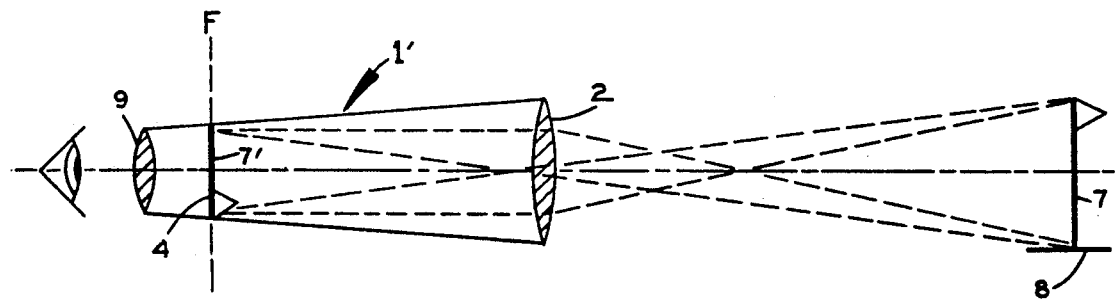
FIG. 1 is a diagrammatic cross-sectional view showing an optical range finder.
Figure 2:
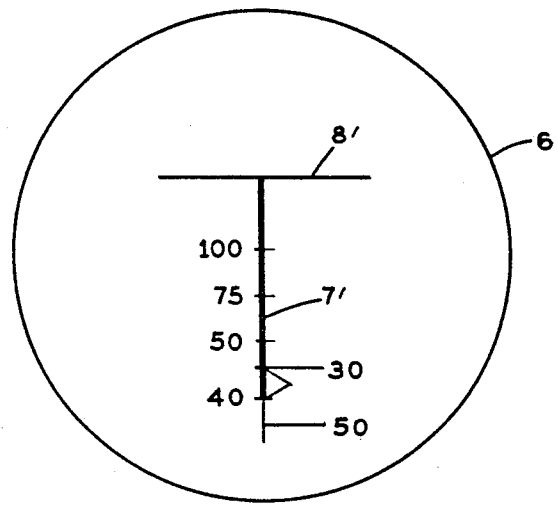
FIG. 2 is an elevational diagrammatic view showing the reticule of an optical range finder.

A diagrammatic view of an optical rangefinder 1', seen in FIG. 1, shows a conventional telescope of the so-called Kepler's type having an objective lens 2 that forms an inverted image 7' of a flag post 7 in an image plane 4 with a graded reticule 6, best seen in FIG. 2. The flag post 7 is in this case the conventional flag positioned in a hole in the ground 8 as well known from golf course greens. The inverted image 7' in the image plane 4 is superimposed on the graded reticule 6, which is graded for example in yards from the flag post 7, wherein the gradations indicate the distance from the viewer to the post 7. The range is determined by aligning the image of a horizontal ground line 8 with a base line 8' on the reticule and reading the distance from the gradations corresponding to the top of the image 7' of the flag post 7, shown in FIG. 2 e.g. at a gradation "40" indicating a distance of 40 yards from the viewer to the flag post.

The image 7' on the image plane 4 is viewed by an ocular lens 9 in conventional manner. The ocular lens 9 can be composed of several lens elements that re-invert the image 7' so that it is seen non-inverted.

Alternatively, instead of a simple optical range finder 1', an electronic range finder 1" can be used. Such electronic range finders are well known, for example from automatic ranging cameras, and an electronic rangefinder for use on a golf course as described in U.S. Pat. No. 5,046,839, the description of which is incorporated herein by reference.

The basic operation of the electronic range finder 1" is briefly described hereinbelow in reference to FIG. 3, wherein an optical light pulse sender-receiver 11 transmits a beam 12 of light pulses of a given repetition rate. Each light pulse is reflected back from the post 7 and is detected in the receive part of the light pulse sender-receiver 11.

A pulse generator 12a drives the light pulse sender component of the sender-receiver 11, and is also connected via lead 13 to an input a of a phase detector 14, having another input b connected to an output of the receive part of the sender-receiver 11 via lead 16. The phase difference between the transmitted and received light pulses is detected in the phase detector 14, e.g. in terms of microseconds. The phase difference is connected via lead 15 to an input of an analog/digital converter 17 producing a digital output on lead 19, which is scaled to represent the distance from the sender-receiver 11 to the post 7, expressed e.g. in yards of range. It follows that the flag post 7 may be painted or coated with a light-reflecting coating of high reflectivity corresponding to the wavelength of the light transmitted from the light pulse sender-receiver 11.

Figure 6:
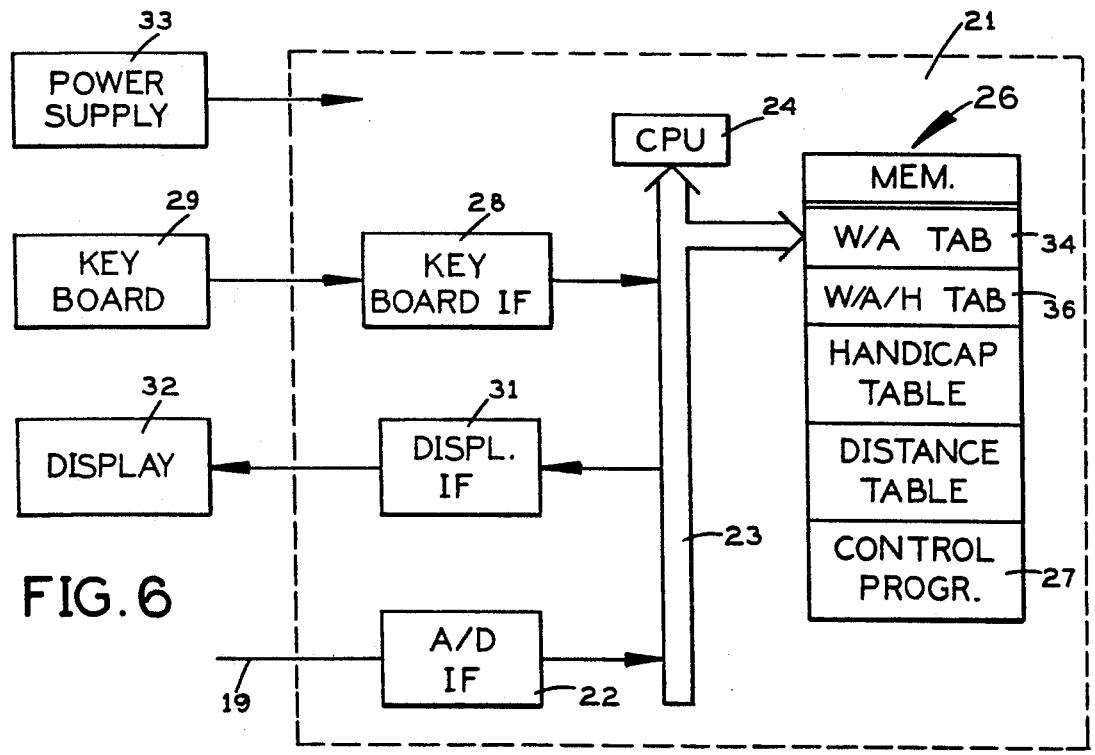
FIG. 6 is a block diagram showing the computer.

A computing device 21 seen in FIG. 6 has an input connected via lead 19 to an analog/digital converter interface (A/D IF) 22, having an output connected to a digital bus 23 of the computing device 21. The digital bus 23 interconnects the various parts of the computing device 21, including central processing unit (CPU) 24, a memory 26, which holds in storage a control program (CONTROL PROGR) 27 that controls the operation of the computing device 21 in accordance with a program flow chart seen in FIG. 7, and various tables as described in more detail below.

The digital bus 23 of the computing device 21 also is connected to a keyboard interface (KEYBOARD IF) 28 connected to a keyboard 29 used for manually entering data into the computing device 21, and a display interface (DISPL IF) 31 connected to a display 32 which displays the computed output from the computing device 21. Power supply means 33 in the form of a battery or rechargeable cell supplies operating power to the device.

Figure 4:
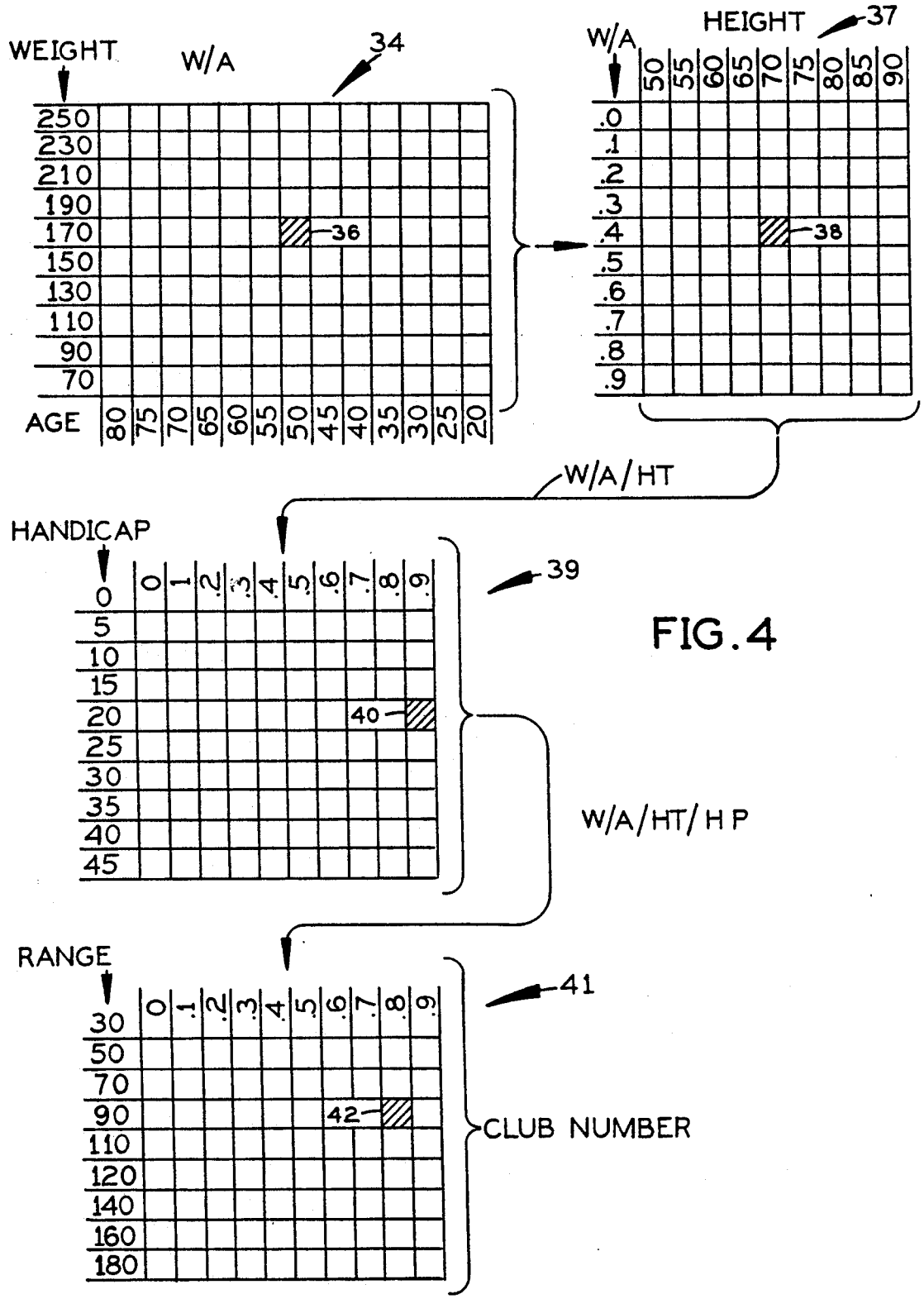
FIG. 4 is a diagrammatic view showing data tables in memory.

In order to indicate to a golf player a suitable club, identified by a club number, for driving a ball to the hole, a number of data tables are included in the memory 26. The structure of the various data tables is shown in FIG. 4, wherein a weight-age table (W/A) 34 has weight ordinate ranging in weights from e.g. 70 to 250 pounds and an age abscissa ranging from ages 20 to 80, for example. For each weight-age input entered on the keyboard 29 the W/A table shows a W/A factor stored in the table in a respective table field 36 which represents a weight of 170 combined with an age of 50 for example. The stored W/A factors are determined on the basis of statistically prepared results of many players of different ages and weights, as described in more detail below.

Next the W/A factors are combined with the player's height, e.g. in inches, in a weight/age/height (W/A/HT) table 37, wherein the W/A factors are inserted in the ordinate axis (W/A) and the heights are inserted in the abscissa, so that each field 38 in the W/A/HT table 37 represents a weight/age/height W/A/HT) factor.

Next the W/A/HT factors are inserted as abscissas into a weight/age/height/handicap (W/A/HT/HP) table 39, having as ordinates the player's handicap, and wherein each field 40 represents a player's weight, age, height and handicap (W/A/HT/HP) factor, which are next inserted as abscissas in a weight/age/height/handicap/range (W/A/HT/HP/R) table 41 having as ordinates the range to the hole e.g. in yards, and wherein each field 42 represents a recommended golf club number, for example from 0 to 10.

In preparing the tables described above, a body of statistical data for a sufficiently large number of strokes is recorded and assembled from a representative group of golf players representing a normal distribution of different personal characteristics such as age, weight, height and handicap. First the W/A table 34 is prepared for each stroke within a given range of a hole, wherein each field 36 is assigned a weight/age (W/A) factor which is equal to the probability of making a hole in one from all recorded distances within the given range, with all values of club numbers. In other words, all fields in table W/A are filled out with a probability value in the probability range e.g. of 0–1. These values are used as entry values W/A to table W/A/HT 37. This table is now filled out with probability values ranged in accordance with the height of the players, as indicated in the abscissa of the table. In this process any correlation between the player's height and the probability of obtaining a hole in one is tabulated. These probabilities are next entered as abscissas in the W/A/HT/HP table 39, wherein the player's handicaps are entered as ordinates. The fields 41 in the W/A/HT/HP table are again inserted as probabilities of hitting a hole in one modified by the player's handicap, and become the W/A/HT/HP factors, which are entered in table 41 as abscissas, and wherein the range to the hole is inserted as ordinates e.g. in yards.

Each field 42 in the latter table is now filled with the club number that was used successfully most times of all the recorded strokes. This number is displayed on the display device 32 as the recommended club to be used for each stroke.

It follows that the recommended club need not be identified by its conventional club number, but can be identified by other club parameters, e.g. its weight, length, material or the like if these club parameters had been used in the original body of statistical data used for club selection. It also follows that other personal data than weight, age, height and handicap could be used in the club selection process, physical strength, years of playing golf and so forth.

The probability number used in the selection process, and stored in the selection tables 34, 37 and 39 is defined simply as the ratio of the average number of strokes resulting in a hole in one divided by the entire number of strokes played for each selection phase.

It follows that the numbers in each table must be rounded so that they match the entry numbers in the next following table, or alternatively the computer control program must perform an interpolation procedure wherein a table number that does not exactly match an entry number of the following table calls in the extrapolation procedure.

The term "factor", e.g. "weight/age factor" as used throughout the description does not imply a factor in the sense of a multiplication product, but means simply the probability of success of the selection on the basis of the various personal data, such as weight, age, height, handicap, etc. as described above.

Figure 3:
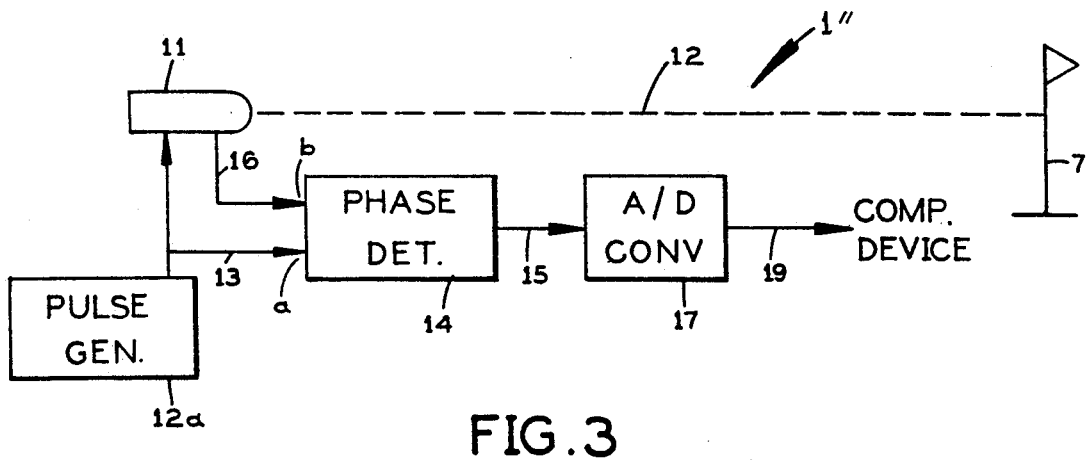
FIG. 3 is a block diagram showing an electronic range finder.
Figure 5:
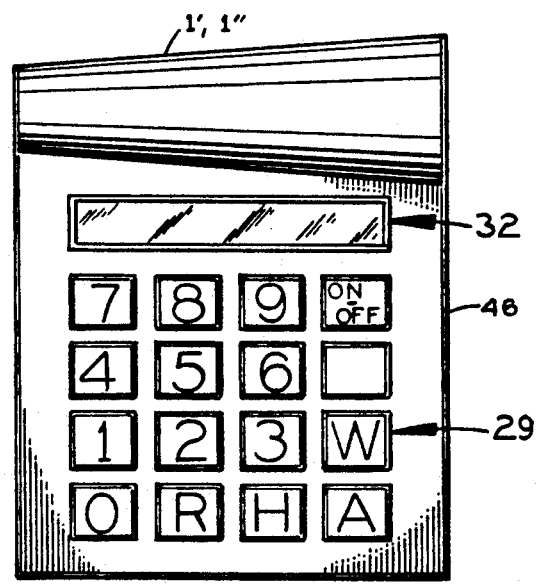
FIG. 5 is an elevational view of the invention showing its major parts.
Figure 8:
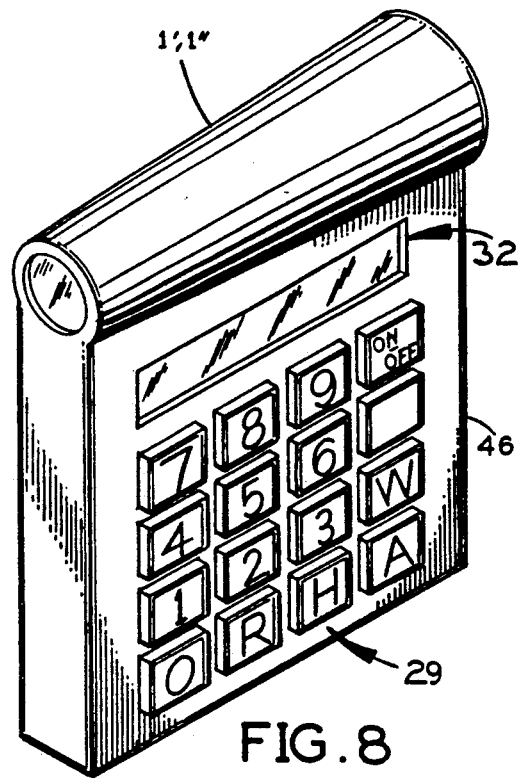
FIG. 8 is a perspective view of the invention.

FIG. 5 is a plan view of the computing device, showing a housing 46 that encloses the computing elements shown in FIGS. 3 and 6, and has a face mounting the display 32 and keyboard 29, and additionally the elements of the ranging device which can be the optical range finder 1' of FIG. 1 or the electronic range finder 1" of FIG. 3. FIG. 8 is a perspective view of the device, showing again the elements described above. FIG. 8 shows that the device can be equipped with an electronic range finder 1" and/or an optical range finder 1', wherein the optical range finder 1' is used as a sighting device while the electronic range finder 1" is used to actually measure the range.

Figure 7:
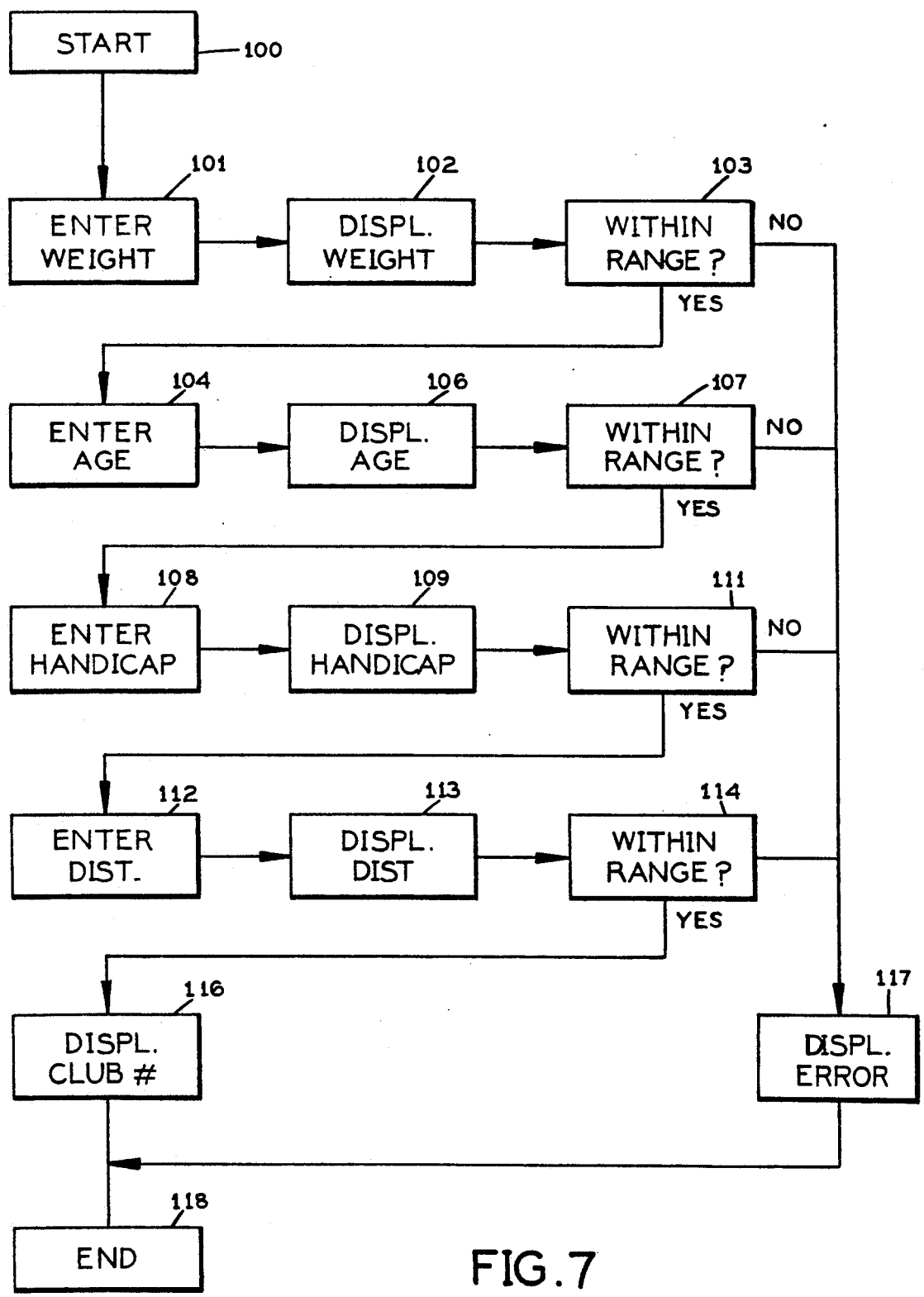
FIG. 7 is a flow chart diagram showing the steps of the operation of the invention.

FIG. 7 is a flowchart showing the steps of the operation of the device, wherein after start step 100, the weight of the player is entered on the keyboard in step 101, followed by the entered weight being displayed in step 102. In decision step 103 it is determined if the entered data fall within the anticipated range. If negative, the next step is an error display, step 117, anf if affirmative vhe next step 104 anticipates an entry of age, which is displayed in step 106. Again, if the entry is outside the anticipated range an error display is made in step 117, and if not, the next step 108 requires an entry of the player's handicap, which is displayed in step 109, followed by a "within range?" step 111, as described above. If affirmative, the distance is entered in step 112, followed by a display of distance in step 113, and a "within range?" step 114. If affirmative the recommended club number is displayed in step 116, followed by "END" step 118.

It follows that a prompt display can be presented before each entry to guide the user through the various steps of using the device as is well-known from computing devices.

I claim:

1. A golf club number computing device for computing a best golf club number for a player comprising range finding means for finding range data from a player to a hole, computing means, data input means connected to said computing means for receiving the range data and the player's personal data, wherein said player's personal data include at least one of the data: player's weight, player's height, player's age and player's handicap, memory means in said computing means, data tables in said memory means holding golf club number data related to said range data and to statistical player personal data selected from a representative group of players; and display means connected to said computing means for displaying a computed best golf club number derived from said data tables.

2. A golf club number computing device according to claim 1, including an optical range finder in said range finding means.

3. A golf club number computing device according to claim 1, including an electronic range finder in said range finding means.

4. A golf club number computing device according to claim 3 including a beam emitter, a pulse generator for pulsing the beam, a pulsed beam receiver, a phase detector connected to the pulsed beam receiver, and an A/D converter connected to the phase detector for generating said range data.

5. A golf club number computing device according to claim 1, including a weight, a height and an age table in said data tables.

6. A golf club number computing device according to claim 5, including a handicap table in said data tables.

7. A golf club number computing device according to claim 6 including a range table in said data tables.

8. A golf club number computing device according to claim 2, including a graded reticule in said optical range finder, graded in distances to said hole.

9. A golf club number computing device according to claim 1, including a keyboard in said input means.

10. A golf club number computing device according to claim 1, including a liquid crystal display in said display means.

11. A golf club number computing device according to claim 1, including a housing for containing said range finding means, said computing means, said data input means, and said display means.

12. A golf club number computing device according to claim 11, including power supply means in said housing.

* * * * *